United States Patent Office 2,785,174
Patented Mar. 12, 1957

2,785,174

ETHYLENE DIAMINE TETRA ACETIC ACID SALTS OF ALKYL IMIDAZOLINES

Hans Schmidt, Wuppertal-Vohwinkel, and Friedrich Meyer, Wuppertal-Barmen, Germany No Drawing. Application April 7, 1953,
Serial No. 347,394

2 Claims. (Cl. 260—309.6)

One object of the invention comprises, among others, a compound of high solubilizing action on calcium salts of the type found in kidney and bladder stones. This and further objects of the invention will be apparent from the following description.

The novel compounds in accordance with the invention consist of the salts of ethylene diamine tetra acetic acid with alkylimidazolines.

These novel salts may be readily produced by dissolving ethylene diamine tetra acetic acid in the aqueous or alcoholic solution of the required amount of an alkyl imidazoline and recovering the resulting salt by solvent precipitation or by evaporation of the solvent. Various salts may be obtained depending upon the number of carboxylic acid groups to be neutralized by the base. Within the preferred application of the novel compounds as solubilizers for certain types of, for instance, kidney or bladder stones, the salts containing 2–4 mole equivalents of the base are of importance, with those containing 3–4 moles of the base of especial usefulness because suitable concentrations of their aqueous solutions have a pH value favorable for their solubilizing power and for their compatibility. If desired, the proportions of base, acid and solvent, such as aqueous medium, may be so selected that the resulting salt solution already possesses as such, the desired pH. Alternatively, an acid reacting salt such as, for example, the disodium salt of the novel compounds may be dissolved in an aqueous medium, adjustment, if necessary, to the desired pH being obtainable by addition of alkylimidazoline.

Aqueous solutions of the salts, in accordance with the invention, which may be introduced into the urinary tract as, for example, with a catheter, show a high solubilizing power for the chemical components of, for instance, urinary calculi (calcium salts and especially urates) as well as for the various kinds of stones of the kidney and the bladder. Pharmacological tests show good local compatibility.

The following examples are furnished for illustration:

Example 1

Seventy-one grams (0.845 mole) of 2-methyl-2-imidazoline (M. W. 84) are dissolved in 100 ml. of water and 79 grams (0.272 mole) ethylene diamine tetra acetic acid (M. W. 292) are added to this solution. The solution is filtered, diluted to 1.6 liters and then shows a pH value of 7.8. Instead of 2-methyl-2-imidazoline also 2-ethyl-, -propyl-, -propenyl-, -butyl- or amyl-2-imidazoline or 4-methyl-2-ethyl-2-imidazoline or 2,4-dimethyl-4-ethyl-2-imidazoline can be used for the salt formation yielding correspondingly similar solutions.

Example 2

Sixteen and eight tenths grams (0.2 mole) of methyl-2-imidazoline are dissolved in 100 ml. of methanol and 14.6 grams (0.05 mole) of ethylene diamine tetra acetic acid are added. By adding 500 ml. ether or by evaporating in vacuo an oil is obtained from the filtered solution, which crystallizes while remaining in vacuo. The aqueous solution of the very hygroscopic tetra-methylimidazolinium-ethylene diamine tetra acetate obtained shows a pH of 8.9. Instead of methanol, also ethanol can be used as a solvent.

Example 3

The filtered solution of 29.2 grams (0.1 mole) of ethylene diamine tetra acetic acid and 16.8 grams (0.2 mole) of 2-methyl-2-imidazoline in 100 ml. of water is evaporated on the water bath. The product obtained is left to crystallize. The di-methylimidazolinium-ethylene diamine tetra acetate is obtained as a colorless crystallized substance, which is easily soluble in water yielding a solution with a pH of 4.1.

The general formula of the alkyl imidazolines from which the novel ethylene diamine tetra acetic acid salts of the present invention are prepared, in its broadest aspect, is:

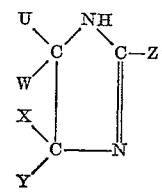

in which Z is an alkyl radical of from 1–5 and preferably 1–4 carbon atoms, in which each of Y, X, W and U is a member of the group consisting of H and alkyl radicals of from 1–5 carbon atoms. Within the preferred embodiment of the invention, however, Y only is such radical and X, W and U are hydrogen. Preferred aqueous solutions of the novel compounds are those of salts containing about 2–4 moles of the last mentioned preferred base of every mole of the ethylene diamine tetra acetic acid and substantially dissolved to a concentration which, as a substantially pure aqueous solution, yields a pH of about 4–9. The optimum efficacy and optimum compatibility is obtained with solutions having a pH of 7–8.5.

Aqueous solutions of salts in accordance with the invention showed an excellent solubilizing potency for urinary calculi. Actual urinary calculi of the carbonate, phosphate, oxalate and urate stone type were dissolved by a 2% solution of the new salts in from 10 to 24 hours and with a 5% solution in 8 to 26 hours.

We claim:

1. An ethylene diamine tetra acetic acid salt of an alkyl imidazoline of the general formula:

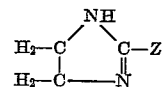

in which Z is an alkyl radical of from 1–4 carbon atoms, and in which the imidazoline component is present in amount of about 2–4 mols for each mol of the acid component.

2. A salt according to claim 1, in which the imidazoline component is present in amount of about 3–4 mols for each mol of the acid component.

References Cited in the file of this patent

UNITED STATES PATENTS 2,155,877    Waldmann et al. _____ Apr. 25, 1939

OTHER REFERENCES

Suby: Drug and Cosmetic Ind., March 1952, vol. 70, No. 3, page 393.

Brendel et al.: J. Am. Pharm. Assoc., March 1953, vol. XLII, No. 3, pages 123–4.